United States Patent [19]

Ratcliff

[11] Patent Number: 4,809,261
[45] Date of Patent: Feb. 28, 1989

[54] SPACE AND TIME SWITCH FOR 22 PCM HIGHWAYS

[75] Inventor: Reginald Ratcliff, Atlanta, Ga.

[73] Assignee: Solid State Systems, Inc., Kennesaw, Ga.

[21] Appl. No.: 72,249

[22] Filed: Jul. 10, 1987

[51] Int. Cl.[4] .......................................... H04Q 11/04
[52] U.S. Cl. .................................. 370/59; 370/60; 370/14
[58] Field of Search ................. 370/6, 14, 58, 59, 60, 370/67, 66

[56] References Cited

U.S. PATENT DOCUMENTS

| | | | |
|---|---|---|---|
| 4,287,590 | 9/1981 | Boute et al. | 370/59 |
| 4,471,479 | 9/1984 | Waas | 370/58 |
| 4,564,936 | 1/1986 | Takahashi | 370/58 |
| 4,570,258 | 2/1986 | McCracken | 370/56 |
| 4,575,841 | 3/1986 | Fagerstedt et al. | 370/14 |
| 4,577,310 | 3/1986 | Korsky et al. | 370/58 |
| 4,583,216 | 4/1986 | Gatmezei et al. | 370/58 |
| 4,627,046 | 12/1986 | Bellamy | 370/58 |
| 4,679,186 | 7/1987 | Lea | 370/14 |
| 4,694,453 | 9/1987 | Kobayashi et al. | 370/14 |

OTHER PUBLICATIONS

Microelectronic Products Data Book, Issue 1, Mitel Semicodverter: pp. 2-15 through 2-32 MT 8980 Digital Time/Space Crosspoint.

Switch, issue 3, Jan. 1985; pp. 2-33 through 2-47 MT 8981 Digital Time/Space Crosspoint Switch, Issue 2, Jan. 1985.

Primary Examiner—M. H. Paschall
Attorney, Agent, or Firm—Jones, Askew & Lunsford

[57] ABSTRACT

A space and time switch receives digitized voice and/or data as twenty-two separate serial bit streams with each voice or data path occupying one time-slot on one bus, resulting in a total of 704 paths entering the switch. The switch originates twenty-two buses and the information in any incoming path can be switched to any outgoing path providing a 704-by-704 switching function. The switch includes six basic functional blocks: input, output, speech RAM, control RAM, controller interface, and state machine. The controller interface receives commands in the form of twenty-four bits appearing as three bytes in three separate operations, stores the bytes until all three are ready, and transfers the command bytes as a combination of address and data bits. The speech RAM stores a complete frame of the data transferred within each time-slot. The control RAM stores commands from the controller interface. The state machine controls operation of the functional blocks and controls readout of the commands from the control RAM, which become addresses for the speech RAM.

38 Claims, 5 Drawing Sheets

Fig_1

SPACE AND TIME SWITCH FOR 22 PCM HIGHWAYS

Cross-Reference to Related Applications

The subject matter described in this application is related to the material disclosed in co-filed U.S. patent application Ser. Nos. 071,979 "PCM RATE CONVERTER"—LuJack Ewell; 072,059 "SPACE AND TIME SWITCH"—Reginald Ratcliff; and 072,254 "CONFERENCING BRIDGE"—Reginald Ratcliff; assigned to the assignee of the present application.

1. Technical Field

This invention pertains to switching systems and more particularly to a space and time switch for telephone communications systems.

2. Background Art

In many communications systems, such as telephone communications systems for example, a switching function is performed enabling one party to communicate with another party. In fact, a telephone central office is a switching system which switches a caller to a desired called party out of a choice of many parties. With modern electronic telephone systems, each telephone subscriber can have his own switching system whereby several lines can be connected to the switching system for calls among and between the various lines and parties.

In a digital telephone system using PCM representations it is necessary to provide PCM switching functions for the telephone lines. A space and time switch can provide these PCM switching functions for a system. The PCM encoded data for the subscriber terminates at and originates from the space and time switch. It is a space and time switch that facilitates connecting any input to any output. Because the space and time switch is fragile, brittle, and performs many switching functions, it can be expensive employing many large scale integrated circuits or complicated circuitry. Accordingly, it will be understood that it would be highly desirable to provide a space and time switch that uses standard small and medium scale integrated circuits to provide a low power, single board space and time switching function module which can be controlled via a simple parallel interface.

SUMMARY OF THE INVENTION

The present invention is directed to overcoming the problems set forth above. Briefly summarized, a space and time switch comprises means for receiving data as a serial bit stream and dividing the stream into a plurality of time-slots. A plurality of buses are formed of a plurality of time-slots. Means are provided for forming data paths with each data path occupying one time-slot on one bus. The space and time switch also includes means for switching a selected incoming time-slot and bus combination to a selected outgoing time-slot and bus combination.

It is an object of the invention to provide a space and time switch for performing PCM switching functions for a switching system using comparatively simple circuitry. It is a feature of the invention that this object is achieved with a space and time switch using standard, small and medium scale integrated circuits arranged on a single board providing a low power space and time switching function module. An advantage provided by the switching module is control accomplished via a simple parallel interface.

It is an object of the invention to provide a reliable space and time switch. It is a feature of the invention that this object is achieved by providing multiple test points for diagnostic purposes. An advantage provided by the diagnostic test points is the ability to perform online testing. A test connector can be used to control an onboard state machine and thereby check operability of the space and time switch.

According to one aspect of the invention, a space and time switch comprises input means for converting twenty-two incoming serial PCM data streams formed of frames of data into twenty-two eight-bit parallel streams and multiplexing the twenty-two parallel streams into one eight-bit parallel data stream. The switch includes control interface means for receiving commands in the form of twenty-four bits appearing as three bytes in three separate operations, storing the bytes until all three are ready and transferring the command bytes as a combination of address and data bits. A speech RAM stores a complete frame of the data transferred within each time-slot. A control RAM stores commands from the control interface means. An output means is provided for receiving a multiplexed 8-bit parallel data stream from the first storage means and converting the stream to twenty two serial streams. The switch also includes state control means for influencing operation of the input means, control interface means, first storage means, second storage means and output means. The state control means controls readout of the commands from the control RAM, which become addresses for the speech RAM.

Digitized voice and/or data is presented to the switch as twenty-two separate serial bit streams. These streams consist of successive frames of thirty-two time-slots each, with frames occurring at an 8 kHz rate. Each voice or data path occupies one time-slot on one bus, resulting in a total of 704 paths entering the switch. The switch originates twenty-two buses and the information in any incoming path can be switched to any outgoing path providing a 704-by-704 switching function. This switching function is achieved using standard small and medium scale integrated circuits.

Other aspects, objects, features and advantages will become apparent to those skilled in the art upon reading the detailed description in conjunction with the accompanying drawings and appended claims.

DETAILED DESCRIPTION OF THE PREFERRED EMBODIMENT

Figure 1:
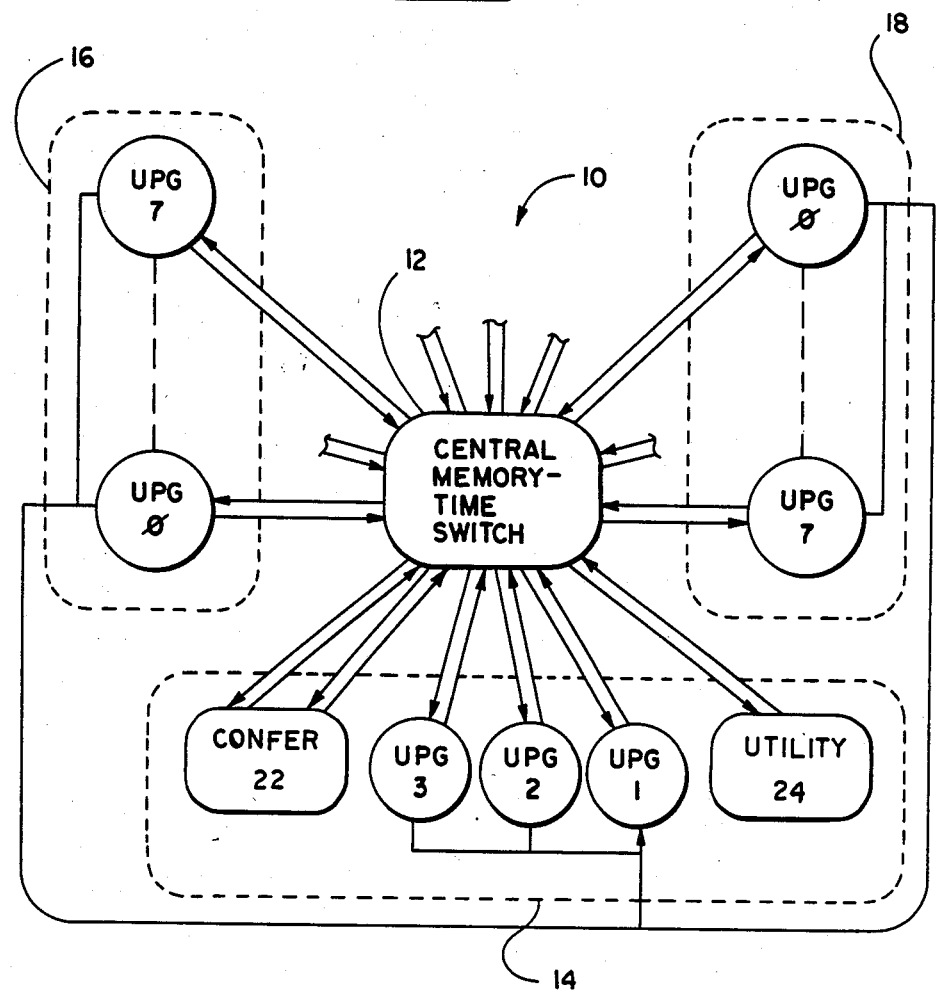
FIG. 1 is a simplified architectural diagram of a preferred embodiment of a digital telephone system incorporating a central memory time switch in accordance with the present invention.
Figure 2:
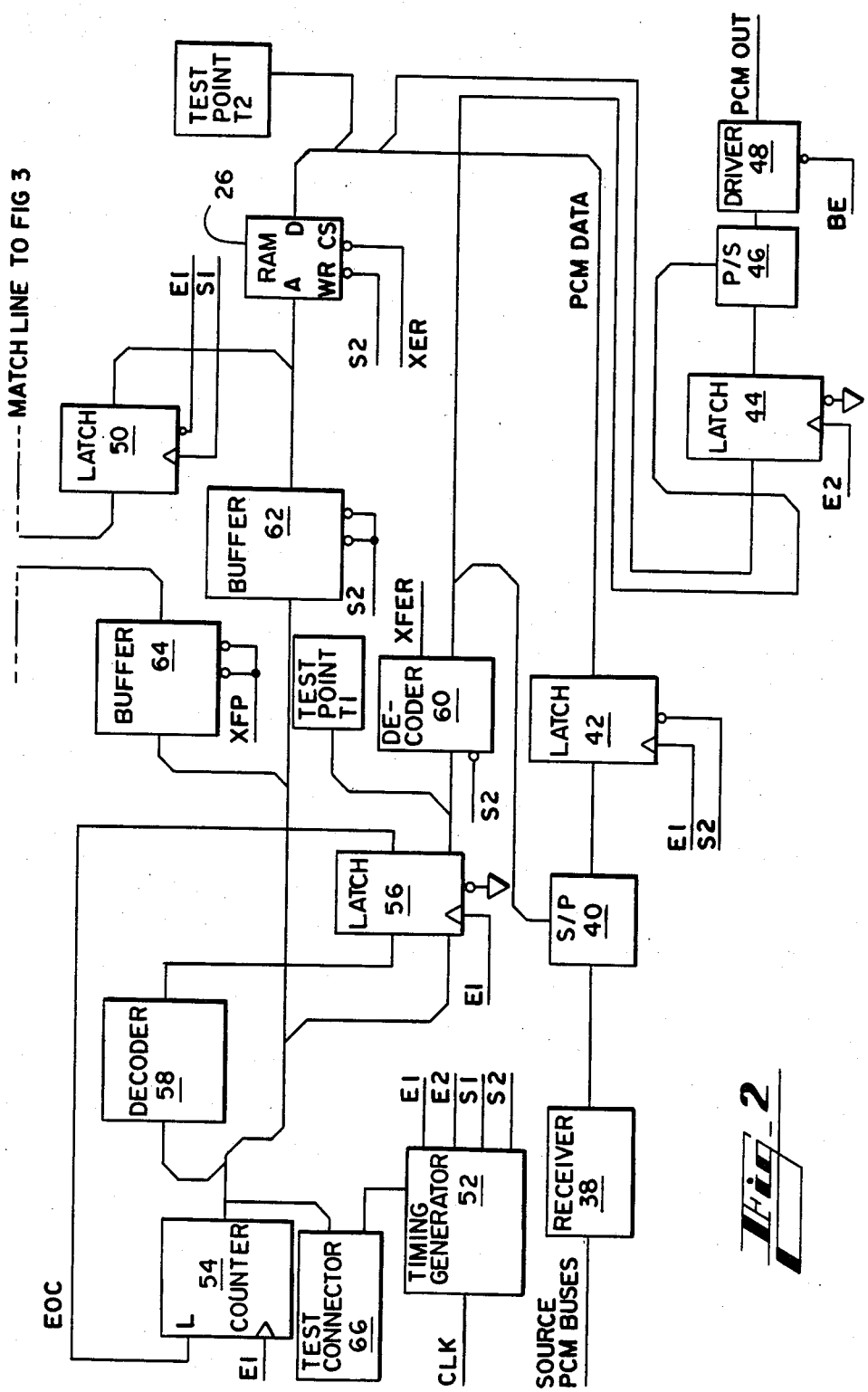
FIG. 2 is a block diagram of a portion of the central memory time switch illustrated in FIG. 1 and is connected to FIG. 3 along the match line.

Referring to FIG. 1, a digital telephone system 10, such as the Senior EXEC System for example, manufactured by Solid State Systems, Inc., 1300 Shiloh Road N.W., Kennesaw, Ga. 30144, incorporates a space and time switch in accordance with the present invention. The space and time switch is identified as central memory time switch ("CMTS") 12. The digital telephone system 10 includes a central control computer, a common equipment shelf and universal port shelves. The digital telephone system 10 has two basic configurations: a smaller version with up to 608 ports; and a larger version with up to 1376 ports. The basic building block of the switching structure is a port group consisting of four universal port module slots. Each port group is connected to the CMTS 12 in the common equipment shelf via a full duplex PCM highway supporting thirty-two time-slots. All paths are set up and maintained by the CMTS 12.

Each universal port shelf contains four port groups comprising sixteen module slots as well as a PCM/clock buffer module and two slots for key phone driver or message waiting lamp modules. Odd numbered universal port shelves also contain a microprocessor module. The common equipment self contains three port groups, one conference/master clock module, one or two circuit boards comprising the CMTS 12, a microprocessor module, two slots for utility modules, and one key phone or message waiting driver. The master clock/conference module provides all the system clock signals for the common equipment shelf, clock and SYNC signals to the PCM/clock buffers in the universal port shelves, and system tones to the CMTS 12.

Two different versions of the CMTS module can be used. The smaller CMTS consists of one PC board and provides a non-blocking 704-by-704 (608 port) switching matrix. The larger CMTS consists of two PC boards and provides a non-blocking 1472-by-1427 (1376 ports) matrix. The larger system is described in greater detail in co-filed application docket number Ser. No. 072,059 which is incorporated herein by reference. Other aspects of a telephone system such as the Senior EXEC System are disclosed in co-filed applications Ser. Nos. 071,979 and 072,254 and are also incorporated herein by reference.

Still referring to FIG. 1, the basic building block of the control structure is a shelf or shelf pair called a supergroup, such as supergroups 14, 16 and 18. The first supergroup 14 contains the common equipment shelf; this is the minimum Senior EXEC System. The additional supergroups 16, 18 consist of pairs of universal port shelves with one of the pair containing a microprocessor module to perform all front end tasks such as scanning and signal distribution. The central control computer issues necessary commands to the various ports and microprocessor. The CMTS 12 may accommodate three supergroups. The common equipment shelf, equipped with an enhanced microprocessor, can support one universal port shelf and operate as a stand alone single supergroup system.

The switching and control architectures are totally independent with the switching architecture being a conventional fixed time-slot/central memory time switch structure. This configuration results in a significantly lower per port cost. The maximum system size attainable with a single level of central time and space switching is determined solely by the maximum size of the central time and space switch. The size of the switch is limited by the semiconductor memory speed and physical packaging constraints due to the large number of I/O pins required. The number of pins required is peculiar to each system. Based on these considerations, the largest CMTS 12 in the Senior EXEC system is a 1472 path device accommodating 46 highways of 32 time-slots each. Allowing 96 ports for system utility functions, the maximum port capacity is 1376 ports. The smaller version of the CMTS 12 operates at half the internal clock speed and supports 22 highway containing a total of 704 time-slots. With 96 ports used for utility functions, the port capacity is 608. The architecture of systems using the small CMTS 12 is upwardly compatible with that of the large CMTS.

The control architecture of the digital telephone system 10 is a distributed multi-processor scheme with a common central computer communicating directly with peripheral devices such as attendant and administration/maintenance consoles, and special purpose devices such as automatic call distribution (ACD) agent consoles. All communication between the central computer and devices located in the common equipment and universal port shelves is accomplished indirectly. The central computer communicates with the self microprocessor and the shelf microprocessor communicates with the devices in the shelves.

Each shelf microprocessor module has two external bus structures: the peripheral bus (PB), and the expansion bus (EB). Both the PB and EB extend a portion of the internal microprocessor bus to make the various registers on the other shelf modules appear as memory mapped I/O to the microprocessor. The PB and EB are separately buffered, but otherwise identical. Each consists of eight-bit directional data lines, twelve address lines, a read strobe, and a write strobe. The microprocessor module located in the common equipment shelf communicates with the utility group, CMTS, conference bridge, or key phone or message waiting (MW) driver, and universal port groups via its peripheral bus.

The switching architecture consists of 22 groups each connected to one PCM highway of the CMTS 12. Each PCM highway supports 32 PCM time-slots in each direction; thus, the CMTS 12 is a non-blocking 704-by-704 matrix. Two of the groups are combined and contain a 64 port conference bridge module 22 which is more fully described in application docket number 2338-1-0260. A utility group 24 transmits tones to the CMTS 12 and contains DTMF and other tone receivers which receive from the CMTS 12. The remaining groups are universal port groups (UPG) each of which may be equipped with any combination of port modules (lines, trunks, tie lines, digital interface modules, etc.) containing a total of 32 or fewer ports. thus, up to 608 ports can be accommodated.

Figure 4:
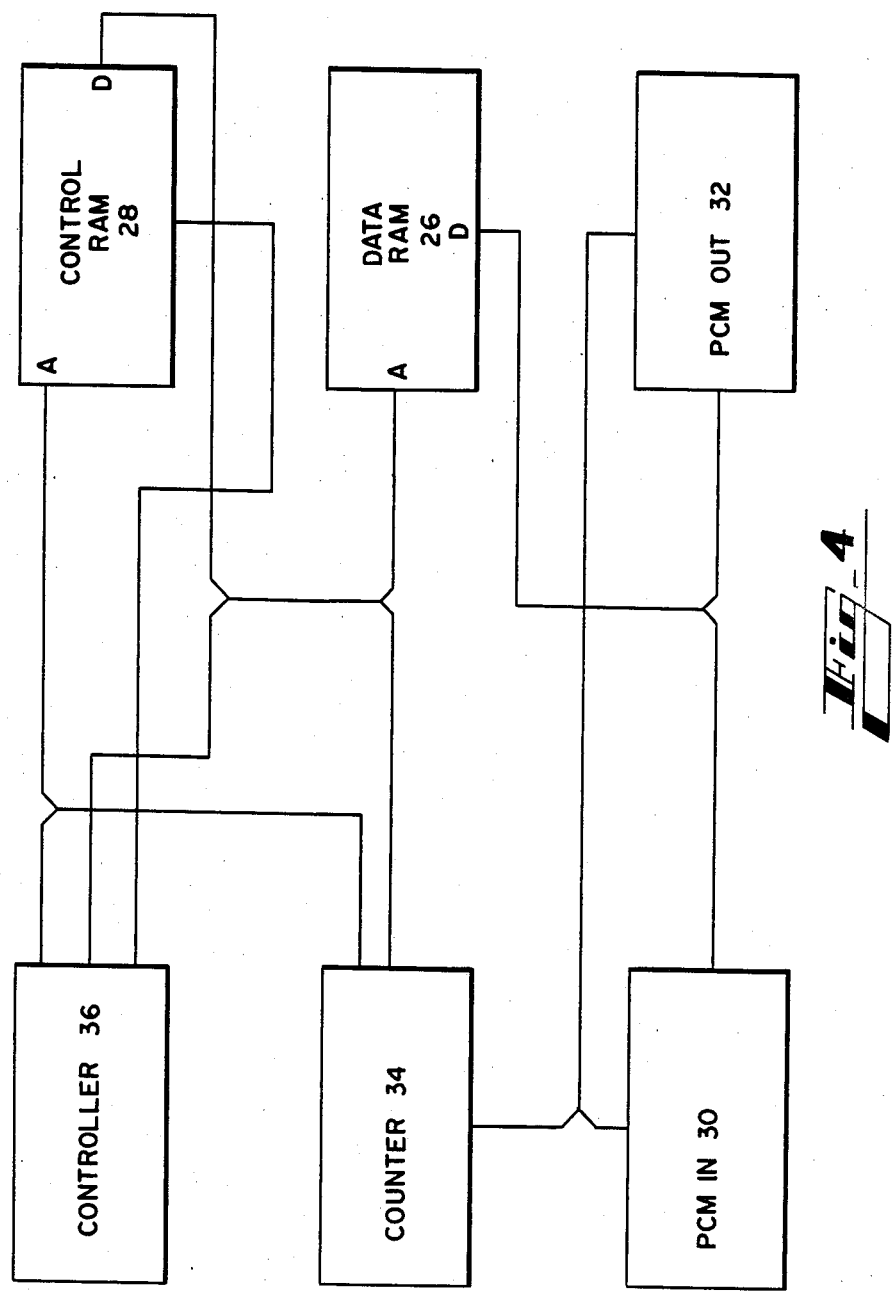
FIG. 4 is a simplified functional block diagram of the central memory time switch illustrated in FIGS. 1 through 3.

Referring to FIGS. 1 and 4, the 22 PCM highways of the CMTS 12 comprise 704 input time-slots and 704 output time-slots. The CMTS 12 consists of a 704-by-8 dual port speech memory RAM 26, a 704-by-11 control memory RAM 28, an input multiplexer 30, an output multiplexer 32, a counter 34 and a controller 36. Basically, the input multiplexer 30 converts the 22 PCM serial data streams into a single 704-by-8 broadside (sample-parallel, time-slot-serial) data stream. In each 125 μs frame, the speech RAM 26 is sequentially loaded with the multiplexed data stream. At the same time the speech RAM 26 output is read out under the control of the contents of the control RAM 28 forming a second 704-by-8 broadside data stream that is converted by the output multiplexer 32 to 22 PCM serial output data streams. Thus, each output time-slot can be programmed to get its data from any of the 704 input time-slots permitting broadcasting wherein multiple receivers are connected to a single source without loading the source or permitting cross-talk between listeners.

Addressing of the paths made up of the 22 highways and 32 time-slots per highway is by supergroup, group and time-slot. The first supergroup 14 contains six groups while the second and third supergroups 16 and 18 contain eight groups each. Each universal port group consists of four module slots. Four such groups are located in each universal port shelf and three are located in the common equipment shelf. Each port in the group is assigned a fixed time-slot for transmission and reception. The time-slot assigned a given port is determined by two parameters: in which physical slot the module is installed, and the relative port position on the module.

For the first supergroup 14, the one-way delay is a minimum of four time-slots and maximum of thirty-five time-slots. For all other supergroups, the minimum delay is three time-slots and a maximum delay is thirty-four time-slots. For a normal two-party conversation, the maximum CMTS induced delay is two frames. As mentioned the CMTS 12 contains six basic functional blocks. The PCM input 30 converts the twenty-two incoming serial PCM data streams into twenty-two eight-bit parallel streams and multiplexes the parallel streams into one eight-bit stream. This input section also provides a differential to single-ended conversion for the sixteen buses that are differential. The six buses from the first supergroup 14 are delayed one bit cell to match the other buses. The PCM output 32 receives a multiplexed eight-bit paralleled data stream from the speech RAM 26, demultiplexes and serializes the parallel stream into twenty-two serial streams. The output section 32 also provides differential drivers for the sixteen differential buses. A one bit delay is added to the first supergroup 14 buses to replace the delay normally provided by buffers within the other supergroups 16 and 18.

The speech RAM 26 stores a complete frame of the data transferred within each time-slot, 704 in all. All data coming from the PCM input 30 is stored in the appropriate location under the control of the counter 34. All data going to the PCM output 32 originates from the speech RAM 26. The control RAM 28 stores commands transferred from the common controller through the control interface 36. These commands are read out under the control of the counter 34 and become addresses for the speech RAM 26.

The counter 34 determines the actions of the other blocks. During each time-slot, the counter 34 advances through twenty-four states. Twenty-two of the states are used to transfer data to and from the PCM input 30 and PCM output 32. These states are divided into two separate substates, of approximately 81 nanoseconds each. During one substate data is transferred from the PCM input block 30 into the speech RAM 26, while the counter 34 provides the speech RAM 26 address. During the other substate, the counter 34 addresses the control RAM 28 and the value read from there is used to address the speech RAM 26. The value read from the speech RAM 26 is then transferred to the output PCM circuitry 32. The twenty-third state is dedicated to the control interface 36. The twenty-fourth state is a null state created to simplify the counter circuits.

Commands from the common control unit are transferred to the CMTS 12 via the control interface 36. Each command consists of twenty-four bits transferred as three bytes in three separate operations. The control interface 36 stores these bytes until all three are ready. These bytes are also translated from values convenient to the controller to values compatible with the internal operation of the CMTS 12. When all are ready, the bytes are transferred into the control RAM 28 as a combination of address and data bits.

Referring to FIGS. 2-6, the PCM input 30 includes buffers/differential receivers 38 providing differential to single-ended conversion for the sixteen buses that are differential, and also includes serial to parallel converters 40. The converters 40 converts the twenty-two incoming serial PCM data streams into twenty-two eight-bit parallel data streams and multiplexes them into one eight-bit stream. The output from the converter 40 is latched by latchable tri-state buffer 42. The PCM output 32 contains similar equipment in reverse order. An output signal is latched by tri-state buffer 44 and is converted by parallel to serial converter 46. The converter 46 receives a multiplexed eight-bit parallel data stream, then multiplexes and serializes the parallel stream into twenty-two serial streams. The twenty-two serial streams are received by buffers/differential drivers 48 providing differential to single-ended conversion for the sixteen buses that are differential. The output from latch 42 is stored in RAM 26 under the control of the counter 34. The control RAM 28 stores commands transferred from the controller 36. These commands are read out of the RAM 28 under control of the counter 34 through a latchable buffer 50 to address RAM 26.

The counter block 34 includes a timing generator 52 and a counter 54. The counter 54 is connected to latchable buffer 56 by line EOC. The latch 56 is connected to counter decoder 58 and to decoder 60. The counter has three stages: one providing a thirty-two-step cycle, one providing a twenty-four-step cycle, and one providing a two-step cycle. The two-step cycle runs inside the twenty-four-step cycle and the twenty-four-step cycle runs inside the thirty-two-step cycle. The thirty-two steps represent the thirty-two time-slots per frame. The twenty-four steps represent the twenty-two PCM highways plus two steps for internal housekeeping and management. The two-step cycle represents the two state implementation of the switching function. The counter 34 directs the CMTS 12 through the steps required to provide each of the 704 (22-by-32) outgoing time-slots with the fresh data every frame. The PCM input section 30 consists of twenty-two dual range shift registers and differential receivers 38 for sixteen of the highways and single-ended receivers for the other six highways. Due to the structure of the digital telephone system 10, there is a one bit cell difference in the timing of the PCM data on the incoming and outgoing highways. The incoming data lags the outgoing data. The counters are keyed to the transmit highway timing.

Data from each receive PCM highway is continuously clocked into shift registers in the differential receiver 38. When the highway portion counter 54 strikes six, the data in the shift registers in differential receiver 38 is moved into a parallel holding register in converter 40. This coincides with the trailing edge of the last bit of each received byte, immediately before the first bit of the next time-slot is shifted in. Then, during state two of each highway counter cycle, the data in the holding register of converter 40 is read out and latched externally by latch 42, to be moved into the data RAM 26. The counter 54 addresses the speech RAM 26 through buffer 62 and addresses the control RAM 28 through buffer 64. A test connector 66 and multiple test points T1-T4 are provided for diagnostic purposes.

Figure 3:
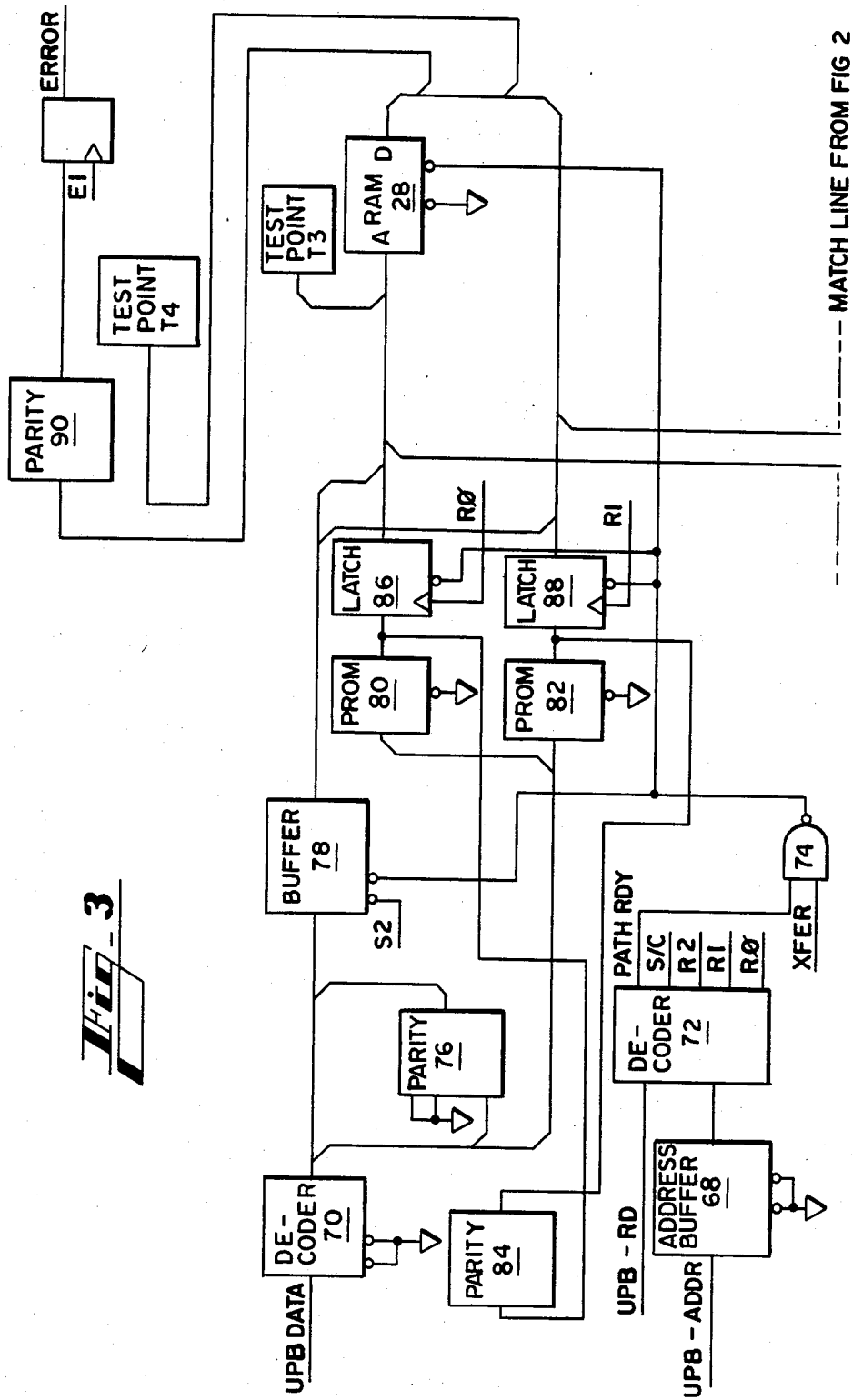
FIG. 3 is a block diagram of a portion of the central memory time switch illustrated in FIG. 1 and is connected to FIG. 2 along the match line.

Referring to FIGS. 3 and 4, the controller block 36 is the interface for transferring commands from the central control unit to the CMTS 12. The controller 36 includes address and data buffers 68 and 70. The address buffer 68 receives a signal from the peripheral bus of the digital telephone system and delivers a signal to address decoder 72. The decoder 72 also receives a write command from the peripheral bus and signals NAND gate 74. Data from the peripheral bus is input into buffer 70. The output of buffer 70 is input to parity register 76, buffer 78 and PROMs 80 and 82. The output of PROM 80 is connected to the input of parity register 84 while the output of PROM 82 is connected to the input of latch 88. The outputs of PROMs 80 and 82 are connected to latches 86 and 88, respectively. Latch 86 is used to address control RAM 28 while latch 88 is connected to the data side of RAM 28 and to parity register 90.

The parity checker 90 checks for contamination of the received path data stored in the control RAM 28. An advantage of the parity circuitry 90 is the ability of the common control unit to detect the presence of parity errors and take corrective action.

Figure 5:
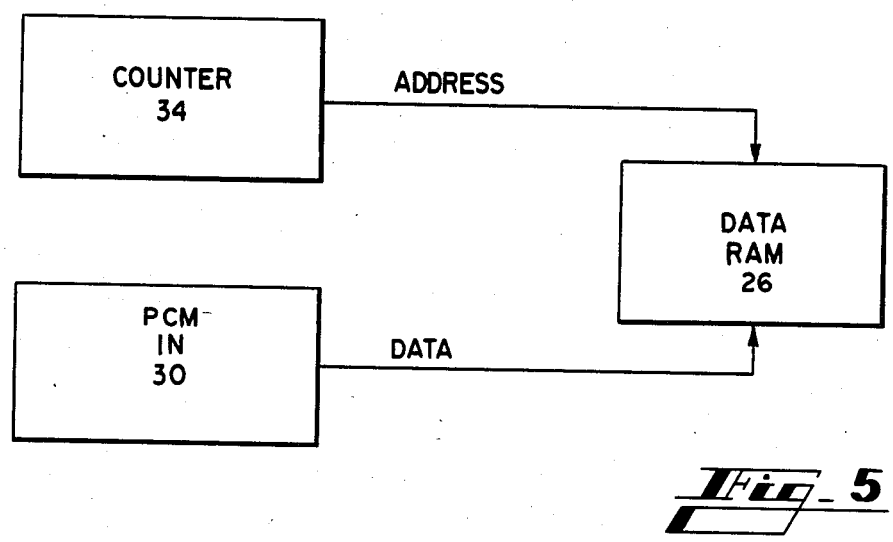
FIG. 5 is a simplified functional block diagram illustrating state one of the central memory time switch illustrated in FIGS. 1 through 3.
Figure 6:
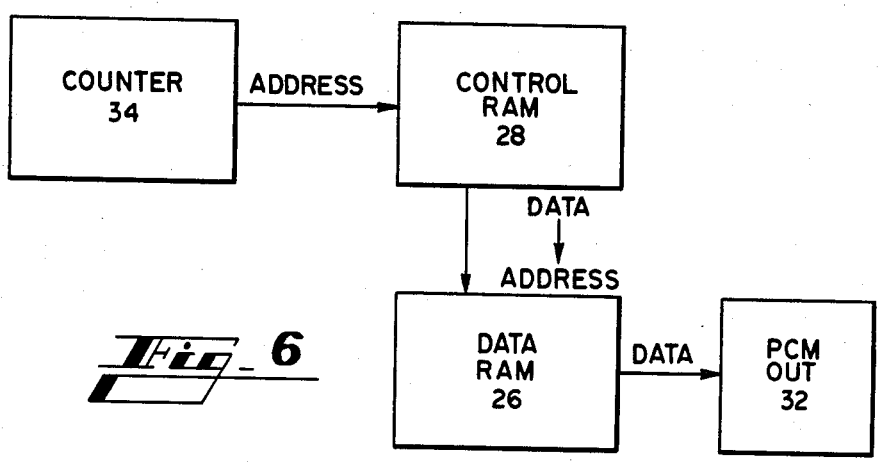
FIG. 6 is a simplified functional block diagram illustrating state two of the central memory time switch illustrated in FIGS. 1 through 3.

FIGS. 5 and 6 illustrate states one and two for the central memory time switch 12. State two of one cycle actually sets up state one for the next cycle. The counter 34 is set to zero by the frame SYNC pulse so that it always designates the current time-slot, although it counts up instead of down as time-slots are officially numbered. The counter 34 address both the control RAM 28 and the data RAM 26 directly during state two as illustrated in FIG. 6. However, because the data in the PCM holding registers are from the previous time-slot and the data to be loaded in the output holding registers of the succeeding time-slot, either the counter value must be modified, or the commands must be written into the control RAM at an address that will anticipate these factors. The latter method is preferable and is the reason for the translation PROMs 80, 82 on the microprocessor interface 36. The address translation PROMs 80 and 82 translate the listener's (transmit) address to account for the one-time-slot delay between when a PCM byte is written to the holding register and when it is shifted to the PCM highway.

The data translation PROM translates the talker's (transmitter) address as necessary to account for the delay between when a PCM byte is shifted in from the highway and when it can be read from the shift register. In the case of the highways in the first supergroup 14 (FIG. 1) the delay is actually two time-slots because the data is not moved from the shift register to the holding register until after these have been moved to the RAM due to the one bit cell timing difference between the transmit and the receive highways. All of the remaining highways are moved to the RAM one time-slot after they are shifted in from the highway. This is a result of the CMTS 12 timing being based on the transmit highway instead of the receive highway. If the receive data is considered relative to the receive highway, then it is always only one time-slot behind when being transferred to RAM.

During any arbitrary time-slot, the path command being read by the control RAM 28 is for the next time-slot. The data being read also accounts for the fact that the PCM word stored in the data RAM 26 is stored under the address of the previous time-slot. For example, if the counter reads 3, the command read from the control RAM 28 will be for time-slot 2 (time-slots are counted form 31 down to 0). If the talker address read from the control RAM 28 is 8, then data addressed into data RAM 26 originated from time-slot 9. During state two, the counter 34 addresses the control RAM 28 and the talker address read from control RAM 28 is latched. The counter 34 also addresses the data RAM 26, and data that was gated from an input shift register during the previous state two is stored in data RAM 26. Because of this one state cycle delay, when the highway counter stays at 0, the shift register addressed is actually associated with highway one. Also, during state two the output shift register for a highway is loaded from a holding register that was loaded in state one. Since the transfer during state one depends on the preceding state two, the shift register to be loaded corresponds to the previous highway counter value. For example, if the highway counter reads 1 the output shift register being loaded will be for highway 0.

The steps involved in a hypothetical connection are illustrated in the example below. The example shows what the counter values are at various points associated with the data transfer, and a brief description of the relevant action at each point. The one-way connection is for subscriber: 174 (supergroup 2, highway 3, time-slot 20) to subscriber: CC (supergroup 1, highway 4, time-slot 12).

TABLE 1

| Time-slot Counter (Inverted) | Highway Counter | State Counter | Action |
| --- | --- | --- | --- |
| 20 | 7-23 | — | Receive data bits 0-6 of time-slot 20 are shifted into the PCM input shift registers. |
| 19 | 0-6 | 2 | Receive data bit 7 of time-slot 20 is shifted into the PCM input shift registers. |
| 19 | 7 | 2 | Data in the serial shift register is transferred to the parallel holding register within the 74595 I.C. |
| 19 | 18 | 2 | Data in parallel holding register associated with highway 19 (Super group 2, highway 3) is transferred to a temporary latch. |
| 19 | 19 | 2 | Data in temporary latch is stored in Data RAM addressed by the counter. |
| End of Receive Portion ||||
| Begin Transmit Portion ||||
| 13 | 12 | 2 | Connection data for next time-slot is read from Control RAM and latched. This data determines who will be heard by time-slot 12 of highway 12. |
| 13 | 13 | 1 | Data RAM address |

TABLE 1-continued

| Time-slot Counter (Inverted) | Highway Counter | State Counter | Action |
|---|---|---|---|
| | | | determined by previous step is read and the data is temporarily latched. |
| 13 | 13 | 2 | Data transferred from temporary latch to holding register of the output shift register for highway 12. |
| 12 | 1 | 2 | Data transferred from holding register to serial shift register of output shift registers. |
| 12 | 2-23 | — | Data for time-slot 12 is shifted onto the highways. |

When the highway counter reads six, data can be transferred from the microprocessor interface to the control RAM 28. Because of the highway numbering scheme and the digital telephone system architecture, there is no PCM data to be transferred at count six. The transfer is performed only if new data has been written into the new byte of the microprocessor interface. The other two bytes are assumed to be valid.

Table 2 is an abbreviated flow chart presented as an example of how the central memory time switch 12 may operate. Table 3 lists the specific data being transferred to and from the PCM interfaces during the 24 states of an arbitrary time-slot called N. During each PCM time frame the CMTS accomplishes 1440 main operations. Of these, 704 are transfers from the PCM input circuitry to the speech RAM; 704 are transfers from the speech RAM to the output PCM circuitry; and the remaining 32 are reserved for transfer of pending commands into the control RAM.

These 1440 operations can be broken down into 45 operations during each of the 32 time-slots. During each time-slot 22 transfers are handled to and from the speech RAM, and one to the control RAM. Each time-slot includes the same operations, but the data for a different time-slot is handled. The abbreviated flow chart of Table 2 outlines the state of different sections of circuitry during any one of the 704 states dedicated to transferring time-slot values.

TABLE 2

| Circuit System | Substate 1 | Substate 2 |
|---|---|---|
| Counter | Advanced to next value, which is used immediately by the Control RAM address section. | New value from Substate 1 is latched for use by the PCM Input, PCM Output and Speech RAM Address sections. |
| Input PCM Section | Temporarily stored data is transferred into Speech RAM | Data shifted in previously is read and temporily stored. |
| Output PCM Speech Section | Idle | Data read from RAM is loaded into parallel-serial converter to be shifted out during next time slot. |
| Speech RAM Address Source | Latched value read from Control RAM during previous state. (i.e. receive path number) | Counter |

TABLE 2-continued

| Circuit System | Substate 1 | Substate 2 |
|---|---|---|
| Speech RAM data | PCM Output data for time slot $N-1$ is read | PCM Input data from time slot $N-1$ or $N-2$ is stored. |
| Control RAM Address source | Advanced Counter value (transmit path value for next state) | Same as Substate 1 |
| Control RAM data | Data for new counter value read (receive path value for next state) | Data settles, and latched at end of substate |

TABLE 3
DATA TRANSFERRED TO AND FROM SPEECH RAM

| | PCM Input Data | | PCM Output Data | |
|---|---|---|---|---|
| Bus Counter | Time-slot | Bus | Time-slot | Bus |
| 0 | $N+2$ | 0 | $N-1$ | 0 |
| 1 | $N+2$ | 1 | $N-1$ | 1 |
| 2 | $N+2$ | 2 | $N-1$ | 2 |
| 3 | $N+2$ | 3 | $N-1$ | 3 |
| 4 | $N+2$ | 4 | $N-1$ | 4 |
| 5 | $N+2$ | 5 | $N-1$ | 5 |
| 6 | Reserved for Command Transfers | | | |
| 7 | NULL | | NULL | |
| 8 | $N+1$ | 10 | $N-1$ | 10 |
| 9 | $N+1$ | 11 | $N-1$ | 11 |
| A | $N+1$ | 12 | $N-1$ | 12 |
| B | $N+1$ | 13 | $N-1$ | 13 |
| C | $N+1$ | 14 | $N-1$ | 14 |
| D | $N+1$ | 15 | $N-1$ | 15 |
| E | $N+1$ | 16 | $N-1$ | 16 |
| F | $N+1$ | 17 | $N-1$ | 17 |
| 10 | $N+1$ | 20 | $N-1$ | 20 |
| 11 | $N+1$ | 21 | $N-1$ | 21 |
| 12 | $N+1$ | 22 | $N-1$ | 22 |
| 13 | $N+1$ | 23 | $N-1$ | 23 |
| 14 | $N+1$ | 24 | $N-1$ | 24 |
| 15 | $N+1$ | 25 | $N-1$ | 25 |
| 16 | $N+1$ | 26 | $N-1$ | 26 |
| 17 | $N+1$ | 27 | $N-1$ | 27 |

In Table 3, time-slots are numbered 0-31, with slot 31 actually occurring at the beginning of a frame and slot 0 at the end. Therefore, when the table indicates that the data from time-slot $N+1$ is being transferred, it is indicating the previous time-slot relative to the one currently on the PCM buses. All timing on the CMTS (except that directly related to the PCM receive shift registers,) is derived from the PCM transmit buses. The two bit difference between transmit and receive buses has two effects: First, six bytes of data transferred from the PCM input are actually two time-slots behind relative to the transmit bus and counter; and the gap must be created after the sixth transfer to allow the parallel registers in the PCM section to be updated. This gap is used for transfers from the control interface to the control RAM.

Time-slots are accounted in a modulo 32 fashion. Therefore, if the time-slot counter says 31, and the data from time-slot $N+1$ is being transferred, $N+1$ is actually time-slot 0. The sequence in Table 3 is repeated for all 32 time-slots in a frame, so that all 704 paths are handled. The counter values in Table 3 represent only the bus related bits. Five other bits keep track of the time-slot as indicated in Table 1.

It will now be appreciated, that there has been presented a central memory time switch for providing all switching functions for a digital telephone system. The CMTS executes a combined time and space switching function. Digitized voice and/or data is presented to the CMTS as thirty-two separate serial bit streams. These bit streams are divided into successive frames of thirty-two time-slots, with each frame occurring at an 8 kHz rate. Each time-slot consists of eight bits so that the data streams run at a 2.048 mbit/s. Each voice or data path occupies one time-slot on one bus so that a total of 704 paths enter the CMTS. The CMTS also originates twenty-two bit streams of thirty-two time-slots. The information in any incoming time-slot-bus combination can be switched to any outgoing time-slot-bus combination under the control of a central processor providing a non-blocking switching function. The CMTS can provide a broadcast function whereby any incoming path can be connected to multiple output paths with absolutely no degradation or crosstalk.

The CMTS is controlled by commands from the digital telephone system microprocessor. To make or change a connection, twenty-four bits are loaded into registers resident in the CMTS. Twelve of the bits describe an incoming bus and time-slot which is to be output on the bus and time-slot described by the remaining twelve bits. Once a connection is set up, it remains in effect until the output path is commanded to receive from a different incoming path. The CMTS is transparent to the data presented to it allowing digitized voice or other analog signals and data to be switched.

The CMTS is constructed in a modular fashion on a single PC board. The circuit board contains the central memory time switch itself, plus single-ended PCM I/O buffers for the six highways used in the common equipment shelf, plus differential (RS 422) I/O buffers for the remaining sixteen PCM highways and associated differential clock/SYNC signals which connect to the four universal port shelves. The PC board can be equipped with board edge LEDs to provide an immediate visual indication of failure or misapplication, since in normal operation they should all be off.

The test connector 66 may be used for production testing. When a test signal on T1 is set low, certain drivers are disabled and the test signals can be driven by a test set through the test connector 66. When T2 is set low, the data RAM 26 is disabled during state two. Setting T3 low disables the control RAM 28 allowing the receive data bus to be driven through the test connector 66. Setting T4 low causes delivery of a write signal to the control RAM 28 during state one. The test connector 66 allows the state machine to be externally controlled and also allows external observation of some of the buses. Some on line diagnostics can be performed with the aid of the diagnostic registers. While keeping a historical record of parity errors detected and located via the diagnostic registers, failing RAM locations or bits can be detected and noted with alarm messages. The diagnostic circuitry can be exercized by setting the parity reverse bit, commanding a connection, and clearing the parity reverse bit. Within one frame the parity error flag should be set and the translated values for the connection may be read from the diagnostic registers.

While the invention has been described with reference to a preferred embodiment, it will be understood by those skilled in the art that various changes may be made and that equivalents may be substituted for elements thereof without departing from the true spirit and scope of the invention. In addition, many modifications may be made to adapt a particular situation and material to the teachings of the invention without departing from the teachings of the present invention. For example, while the invention has been described in connection with digital telephone systems, it is equally applicable to other switching systems, multiplexers, demultiplexers, and other cross-connect systems for digitally represented information.

I claim:
1. A space and time switch; comprising:
   means for receiving data as at least one serial bit stream and dividing said stream into a plurality of time-slots;
   means for originating a plurality of buses with each bus formed of a plurality of time-slots;
   test interface means for connecting external test equipment for accessing and manipulating said buses;
   means for forming data paths with each data path occupying one time-slot on one bus;
   means for switching a selected incoming time-slot and bus combination to a selected outgoing time-slot bus combination; and
   means for controlling said switching means.
2. A switch according to claim 1 including means for providing a nonblocking matrix switching function.
3. A switch according to claim 1 including means for switching any incoming time-slot and bus combination to any outgoing time-slot and bus combination.
4. A switch according to claim 1 including means for connecting any incoming path to multiple outgoing paths.
5. A switch according to claim 1 wherein said receiving means is transparent to the data presented.
6. A switch according to claim 5 wherein said data is digitized voice.
7. A switch according to claim 5 wherein said data is any digitally represented information.
8. A space and time swich, comprising:
   input means for converting incoming PCM data streams formed of frames of data into parallel streams and multiplexing said parallel streams into one stream;
   control interface means for receiving command data in the form of bytes and transferring said command bytes as a combination of address and data bits;
   first storage means for storing a complete frame of the data transferred within each time-slot;
   second storage means for storing commands from said control interface means;
   output means for receiving a multiplexed stream from said first storage means and converting said stream to a serial stream; and
   state control means for influencing operation of said input means, control interface means, first storage means, second storage means and output means.
9. A switch according to claim 8 wherein during each time-slot said state control means advances through at least twenty-two states transferring data to and from said input means and output means.
10. A switch according to claim 9 wherein said states are divided into two separate substates and wherein during one substate data transferred from said input means to said first storage means and said state control means addresses said first storage means.
11. A switch according to claim 10 wherein during the other substate said state control means addresses said second storage means and the value read is used to address said first storage means.
12. A switch according to claim 8 including test interface means for connecting external test equipment for accessing and manipulating said buses.

13. A switch according to claim 8 including means, external to said state control means, for controlling said state control means and facilitating static testing and troubleshooting.

14. A switch according to claim 8 including means for providing access points for component or near component level diagnostics.

15. A switch according to claim 8 including means for providing access points for component or near component level diagnostics by external equipment.

16. A switch according to claim 8 wherein said state control means includes a counter having three stages.

17. A switch according to claim 16 wherein one stage of said counter provides a thirty-two step cycle.

18. A switch according to claim 16 wherein one stage of said counter provides a twenty-four step cycle.

19. A switch according to claim 16 wherein one stage of said counter provides a two-step cycle.

20. A switch according to claim 8 wherein said state control means includes a three stage counter providing a thirty-two step cycle, a twenty-four step cycle and a two-step cycle.

21. A switch according to claim 20 wherein said twenty-four step cycle runs inside said thirty-two step cycle.

22. A switch according to claim 20 wherein said two-step cycle runs inside said twenty-four step cycle.

23. A space and time switch, comprising:
input means for converting twenty-two incoming serial PCM data streams formed of frames of data into twenty-two 8-bit parallel streams and multiplexing said twenty-two parallel streams into one 8-bit parallel data stream;
control interface means for receiving commands in the form of twenty-four bits appearing as three bytes in three separate operations, storing said bytes until all three are ready and transferring said command bytes as a combination of address and data bits;
a speech RAM storing a complete frame of the data transferred within each time-slot;
a control RAM storing commands from said control interface means;
output means for receiving a multiplexed 8-bit parallel data stream from said speech RAM and converting said stream to a serial stream; and
state control means for influencing operation of said input means, control interface means, speech RAM, control RAM, and output means, said state control means controlling readout of the commands from said control RAM, said readout commands becoming addresses for said speech RAM.

24. A switch according to claim 23 wherein during each time-slot said state control means advances through twenty-four states with twenty-two states used to transfer data to and from said input means and output means.

25. A switch according to claim 24 wherein said states are divided into two separate substates of approximately eighty one nanoseconds each and wherein during one substate data transferred from said input means to said speech RAM while said state control means addresses said speech RAM.

26. A switch according to claim 25 wherein during the other substate said state control means addresses said control RAM and the value read is used to address said speech RAM.

27. A switch according to claim 23 wherein the twenty-fourth state is a null state adapted to simplify circuitry of said state control means.

28. A switch according to claim 23 including test interface means for connecting external test equipment for accessing and manipulating said buses.

29. A switch according to claim 23 including means, external to said state control means, for controlling said state control means and facilitating static testing and troubleshooting.

30. A switch according to claim 23 including means for providing access points for component or near component level diagnostics.

31. A switch according to claim 23 including means for providing access points for component or near component level diagnostics by external equipment.

32. A switch according to claim 23 wherein said state control means includes a counter having three stages.

33. A switch according to claim 23 wherein one stage of said counter provides a thirty-two step cycle.

34. A switch according to claim 23 wherein one stage of said counter provides a twenty-four step cycle.

35. A switch according to claim 23 wherein one stage of said counter provides a two-step cycle.

36. A switch according to claim 23 wherein said state control means includes a three stage counter providing a thirty-two step cycle, a twenty-four step cycle and a two-step cycle.

37. A switch according to claim 36 wherein said twenty-four step cycle runs inside said thirty-two step cycle.

38. A switch according to claim 36 wherein said two-step cycle runs inside said twenty-four step cycle.

* * * * *